United States Patent Office 3,561,986
Patented Feb. 9, 1971

3,561,986
BOROSILICATE GLASS COMPOSITION
Heinz Broemer, Hermannstein, Kreis Wetzlar, and Norbert Meinert, Wetzlar, Germany, assignors to Ernst Leitz G.m.b.H., Wetzlar, Germany
No Drawing. Filed May 1, 1967, Ser. No. 634,904
Claims priority, application Germany, July 16, 1966, L 54,091
Int. Cl. C03c 3/08, 3/10
U.S. Cl. 106—53        7 Claims

ABSTRACT OF THE DISCLOSURE

An optical glass composition is disclosed which consists essentially of 42 to 52 mole percent of the glass formers $B_2O_3$ and $SiO_2$ with the mole ratio of $B_2O_3$ to $SiO_2$ ranging from 3, 4 to 4, 8. The composition further comprises 36 to 46 mole percent of the oxides of the elements of the group of zinc, cadmium, lead and lanthanum with the percentage of zinc oxide and/or cadmium oxide ranging from 12 to 22 mole percent, the percentage of lead oxide ranging from 8 to 24 mole percent, and the percentage of lanthanum oxide ranging from 2 to 10 mole percent. 10 to 15 mole percent of at least three oxides of the elements of the group of calcium, aluminium, titanium, zirconium, and tungsten.

BACKGROUND OF THE INVENTION

(1) Field of the invention

The present invention relates to optical glass. More specifically the invention relates to a borosilicate glass composition.

(2) Description of the prior art

In computing optical systems the dispersion values of the employed collecting and diverging lenses are of material importance to the chromatic correction. For this reason it is extremely difficult to make use of the heavy flint glass compositions known in the art in combination with the highly lanthanum containing crown glasses which have been developed in recent years. In order to overcome this disadvantage a highly refractive glass composition had to be found, said glass having smaller dispersion than that of the known heavy flint glasses. In addition to these desired optical values the composition had also to possess those properties as are required by modern production methods, e.g. chemical stability, suitability for moulding etc.

SUMMARY OF THE INVENTION

This goal is achieved by a glass composition which, according to our invention, consists of 42 to 52 mole percent of the glass formers $B_2O_3$ and $SiO_2$ with the mole ratio of $B_2O_3$ to $SiO_2$ ranging from 3,4 to 4,8. The composition further comprises 36 to 46 mole percent of the oxides of the elements of the group of zinc, cadmium, lead and lanthanum with the percentage of zinc oxide and/or cadimum oxide ranging from 12 to 22 mole percent, the percentage of lead oxide ranging from 8 to 24 mole percent, and the percentage of lanthanum oxide ranging from 2 to 10 mole percent. 10 to 15 mole percent consist of at least three oxides of the elements of the group of calcium, aluminium, titanium, zirconium, and tungsten. MgO, SrO and BaO are earth alkali oxide equivalents to CaO, as per teachings George X. Morey in "Properties of Glass," 2nd edition, 1954, page 76. The percentage of these oxides ranging as indicated below:

| | Mole percent |
|---|---|
| CaO | 0–5 |
| $Al_2O_3$ | 0–3 |
| $TiO_2$ | 0–4 |
| $ZrO_2$ | 0–7 |
| $WO_3$ | 0–3 |

DESCRIPTION OF THE PREFERRED EMBODIMENTS

In the following tables various examples of glass compositions according to our invention are listed together with their batch constituents and optical values.

Table 1 demonstrates the effect of replacing lead oxide by lanthanum oxide.

In the compositions listed in Table 2 major quantities of zinc oxide and lanthanum oxide are introduced while at the same time lead oxide is reduced accordingly.

Table 3 contains glass compositions having a relatively small content of lanthanum, thereby making readily discernible the effect of substituting boric acid for zinc oxide.

The glasses may easily be melted color poor and do not present any difficulties in further treatment. The content of barium oxide should be kept as low as possible, since barium oxide tends to make the glasses soft and sensitive to stains.

Preferably, the batch constituents are melted in a crucible of platinum at temperatures ranging up to 1100° C. Refining takes place at temperatures up to 1300° C. After said refining the melts are stirred continuously while cooling to cast temperature of approximately 800° C. The glasses are then poured into slightly warm steel moulds.

As is well known in the art small quantities of arsenic trioxide and oxide of antimony may be added for color improvement.

A specific example how to melt a glass composition according to our invention is as follows:

A glass batch according to the Examples 1 or 9 of a total weight of 4 kp. is melted at 1000° C. in a crucible of platinum. Thereafter it is refined for 90 minutes at 1200° C. When the temperature has decreased to 1170° C. the melt is stirred for 50 minutes and then, while continuously being stirred, the melt is cooled to 780° C. At that temperature the glass is cast into steel moulds, the latter being pre-heated to 550° C. Further cooling and annealing is accomplished in customary manner. The transformation point of this glass is at 480° C., the softening point at 522° C. The glass has a coefficient of expansion of $6,4 \times 10^{-6}$ in the temperature range from 100° to 150° C. The optical values are $n_e = 1,8430$ and $v_e = 30,0$.

TABLE 1

| | Example | | | | | | | | | | | |
|---|---|---|---|---|---|---|---|---|---|---|---|---|
| | 1 | | 2 | | 3 | | 4 | | 5 | | 6 | |
| | Percent by weight | Mole percent | Percent by weight | Mole percent | Percent by weight | Mole percent | Percent by weight | Mole percent | Percent by weight | Mole percent | Percent by weight | Mole percent |
| $B_2O_3$ | 20.0 | 35.5 | 20.0 | 35.8 | 20.0 | 35.8 | 20.0 | 36.0 | 20.0 | 36.2 | 20.0 | 36.3 |
| $SiO_2$ | 5.0 | 10.3 | 5.0 | 10.3 | 5.0 | 10.4 | 5.0 | 10.5 | 5.0 | 10.5 | 5.0 | 10.6 |
| ZnO | 10.0 | 15.1 | 10.0 | 15.1 | 10.0 | 15.2 | 10.0 | 15.3 | 10.0 | 15.3 | 10.0 | 15.4 |
| PbO | 40.0 | 22.4 | 37.5 | 21.0 | 35.0 | 19.7 | 32.5 | 18.3 | 30.0 | 17.1 | 27.5 | 15.7 |
| $La_2O_3$ | 12.5 | 4.7 | 15.0 | 5.9 | 17.5 | 6.8 | 20.0 | 7.7 | 22.5 | 8.7 | 25.0 | 9.8 |
| $ZrO_2$ | 4.2 | 4.3 | 4.2 | 4.2 | 4.2 | 4.3 | 4.2 | 4.3 | 4.2 | 4.3 | 4.2 | 4.3 |
| $TiO_2$ | 2.0 | 3.1 | 2.0 | 3.1 | 2.0 | 3.1 | 2.0 | 3.2 | 2.0 | 3.2 | 2.0 | 3.2 |
| $WO_3$ | 4.5 | 2.4 | 4.5 | 2.4 | 4.5 | 2.4 | 4.5 | 2.4 | 4.5 | 2.4 | 4.5 | 2.4 |
| $Al_2O_3$ | 1.8 | 2.2 | 1.8 | 2.2 | 1.8 | 2.3 | 1.8 | 2.3 | 1.8 | 2.3 | 1.8 | 2.3 |
| $n_e$ | 1.8430 | | 1.8412 | | 1.8396 | | 1.8387 | | 1.8365 | | 1.8352 | |
| $v_e$ | 30.0 | | 30.4 | | 31.0 | | 31.2 | | 32.3 | | 33.0 | |

TABLE 2

| | Example | | | |
|---|---|---|---|---|
| | 7 | | 8 | |
| | percent by weight | Mole percent | percent by weight | Mole percent |
| $B_2O_3$ | 25.5 | 42.0 | 22.5 | 39.2 |
| $SiO_2$ | 4.6 | 8.9 | 5.1 | 10.4 |
| CaO | 2.0 | 4.2 | 2.0 | 4.4 |
| ZnO | 12.7 | 17.8 | 17.7 | 18.8 |
| PbO | 19.6 | 10.2 | 16.6 | 9.0 |
| $La_2O_3$ | 25.0 | 8.9 | 25.0 | 9.4 |
| $ZrO_2$ | 6.1 | 5.8 | 5.6 | 5.6 |
| $TiO_2$ | | | | |
| $WO_3$ | 4.5 | 2.2 | 4.5 | 2.3 |
| $Al_2O_3$ | | | | |
| $SnO_2$ | | | 1.0 | 0.9 |
| $n_e$ | 1.7888 | | 1.7944 | |
| $v_e$ | 38.6 | | 38.6 | |

TABLE 3

| | Example | | | | | |
|---|---|---|---|---|---|---|
| | 9 | | 10 | | 11 | |
| | percent by weight | Mole percent | percent by weight | Mole percent | percent by weight | Mole percent |
| $B_2O_3$ | 20.0 | 35.5 | 25.0 | 41.4 | 20.0 | 33.7 |
| $SiO_2$ | 5.0 | 10.3 | 5.0 | 9.7 | 5.0 | 9.8 |
| CaO | | | | | | |
| ZnO | 10.0 | 15.1 | 10.0 | 14.1 | 15.0 | 21.4 |
| PbO | 40.0 | 22.4 | 40.0 | 20.9 | 40.0 | 21.2 |
| $La_2O_3$ | 12.5 | 4.7 | 7.5 | 2.7 | 7.5 | 2.7 |
| $ZrO_2$ | 4.2 | 4.3 | 4.2 | 4.0 | 4.2 | 4.0 |
| $TiO_2$ | 2.0 | 3.1 | 2.0 | 2.9 | 2.0 | 2.9 |
| $WO_3$ | 4.5 | 2.4 | 4.5 | 2.2 | 4.5 | 2.2 |
| $Al_2O_3$ | 1.8 | 2.2 | 1.8 | 2.1 | 1.8 | 2.1 |
| $SnO_2$ | | | | | | |
| $n_e$ | 1.8403 | | 1.7968 | | 1.8314 | |
| $v_e$ | 30.0 | | 31.7 | | 29.8 | |

Having fully disclosed the invention, what is claimed is:

1. A borosilicate glass composition the melt combination consisting in mole percent of:

| | Mole percent |
|---|---|
| $B_2O_3$ | 35.5 |
| $SiO_2$ | 10.3 |
| ZnO | 15.1 |
| PbO | 22.4 |
| $La_2O_3$ | 4.7 |
| $ZrO_2$ | 4.3 |
| $TiO_2$ | 3.1 |
| $WO_3$ | 2.4 |
| $Al_2O_3$ | 2.2 | with $n_e$ being 1.8430 and $v_e$ being 30.0.

2. A borosilicate glass composition the melt combination consisting in mole percent of:

| | Mole percent |
|---|---|
| $B_2O_3$ | 35.8 |
| $SiO_2$ | 10.3 |
| ZnO | 15.1 |
| PbO | 21.0 |
| $La_2O_3$ | 5.9 |
| $ZrO_2$ | 4.2 |
| $TiO_2$ | 3.1 |
| $WO_3$ | 2.4 |
| $Al_2O_3$ | 2.2 | with $n_e$ being 1.8412 and $v_e$ being 30.4.

3. A borosilicate glass composition the melt combination consisting in mole percent of:

| | Mole percent |
|---|---|
| $B_2O_3$ | 35.8 |
| $SiO_2$ | 10.4 |
| ZnO | 15.2 |
| PbO | 19.7 |
| $La_2O_3$ | 6.8 |
| $ZrO_2$ | 4.3 |
| $TiO_2$ | 3.1 |
| $WO_3$ | 2.4 |
| $Al_2O_3$ | 2.3 | with $n_e$ being 1.8396 and $v_e$ being 31.0.

4. A borosilicate glass composition the melt combination consisting in mole percent of:

| | Mole percent |
|---|---|
| $B_2O_3$ | 36.0 |
| $SiO_2$ | 10.5 |
| ZnO | 15.3 |
| PbO | 18.3 |
| $La_2O_3$ | 7.7 |
| $ZrO_2$ | 4.3 |
| $TiO_2$ | 3.2 |
| $WO_3$ | 2.4 |
| $Al_2O_3$ | 2.3 | with $n_e$ being 1.8387 and $v_e$ being 31.2.

5. A borosilicate glass composition the melt combination consisting in mole percent of:

| | Mole percent |
|---|---|
| $B_2O_3$ | 36.2 |
| $SiO_2$ | 10.5 |
| ZnO | 15.3 |
| PbO | 17.1 |
| $La_2O_3$ | 8.7 |
| $ZrO_2$ | 4.3 |
| $TiO_2$ | 3.2 |
| $WO_3$ | 2.4 |
| $Al_2O_3$ | 2.3 | with $n_e$ being 1.8365 and $v_e$ being 32.3.

6. A borosilicate glass composition the melt combination consisting in mole percent of:

| | Mole percent |
|---|---|
| $B_2O_3$ | 36.3 |
| $SiO_2$ | 10.6 |
| ZnO | 15.4 |
| PbO | 15.7 |
| $La_2O_3$ | 9.8 |
| $ZrO_2$ | 4.3 |
| $TiO_2$ | 3.2 |
| $WO_3$ | 2.4 |
| $Al_2O_3$ | 2.3 | with $n_e$ being 1.8352 and $v_e$ being 33.0.

7. A borosilicate glass composition the melt combination consisting in mole percent of:

| | Mole percent |
|---|---|
| $B_2O_3$ | 35.5 |
| $SiO_2$ | 10.3 |
| ZnO | 15.1 |
| PbO | 22.4 |
| $La_2O_3$ | 4.7 |
| $ZrO_2$ | 4.3 |
| $TiO_2$ | 3.1 |
| $WO_3$ | 2.4 |
| $Al_2O_3$ | 2.2 | with $n_e$ being 1.8403 and $v_e$ being 30.0.

References Cited

UNITED STATES PATENTS

| | | | |
|---|---|---|---|
| 2,678,281 | 5/1954 | Geffcken et al. | 106—53 |
| 2,899,322 | 8/1959 | Brömer et al. | 106—47 |
| 3,043,702 | 7/1962 | Brömer et al. | 106—53 |
| 3,149,984 | 9/1964 | Faulstich | 106—47 |

FOREIGN PATENTS

| | | | |
|---|---|---|---|
| 783,110 | 9/1957 | Great Britain | 106—53 |

HELEN M. McCARTHY, Primary Examiner